United States Patent [19]

Deczky et al.

[11] Patent Number: 4,761,758

[45] Date of Patent: Aug. 2, 1988

[54] DIGITAL SIGNAL PROCESSOR WITH DIVIDE FUNCTION

[75] Inventors: Andrew G. Deczky; Stephen G. Rayment, both of Nepean, Canada

[73] Assignee: Northern Telecom Limited, Montreal, Canada

[21] Appl. No.: 902,988

[22] Filed: Sep. 2, 1986

[51] Int. Cl.⁴ .............................................. G06F 7/52
[52] U.S. Cl. .................................................... 364/761
[58] Field of Search ........................ 364/761, 736, 764

[56] References Cited

U.S. PATENT DOCUMENTS 4,238,833 12/1980 Ghest et al. .......................... 364/760
4,700,324 10/1987 Doi et al. ............................. 364/728

FOREIGN PATENT DOCUMENTS 0042452 12/1981 European Pat. Off. ............ 364/736

OTHER PUBLICATIONS

Hamacher et al., "Computer Organization", published by McGraw-Hill, pp. 208-211, 1984.

Primary Examiner—Gary V. Harkcom
Assistant Examiner—Tan V. Mai
Attorney, Agent, or Firm—John E. Mowle

[57] ABSTRACT

A digital signal processor which efficiently executes the division of a positive number in N+1 processor cycles where N is equal to the number of digits in the dividend. This is achieved by utlizing an arithmetic logic unit in the processor which is divided into two selectively concatenated independently controllable sections so that the values therein can be selectively processed under control of a unique algorithm.

1 Claim, 2 Drawing Sheets

DIGITAL SIGNAL PROCESSOR WITH DIVIDE FUNCTION

This invention relates to a digital signal processor and more particularly to one in which the division of an N-bit positive dividend by a positive divisor can be executed in N+1 processor cycles.

BACKGROUND OF THE INVENTION

Digital signal processors utilizing a microcomputer have been developed to perform a variety of tasks more efficiently than can generally be achieved utilizing a general purpose microprocessor. One standard division technique employed in such digital signal processors utilizes a radix 2 non-restoring divide algorithm. Such a known operation utilizes the sequence shown in TABLE I with the results of each processing step being repetitively stored in two accumulators to derive the final quotient and remainder.

In step 1 of TABLE I, an accumulator ACC1 which will eventually hold the remainder R, is initialized to 0. An accumulator ACC0 which will eventually hold the quotient Q, is loaded with the dividend d.

In step 2a, the remainder R is first tested to determine whether it is less than 0. Both the current R and Q values in accumulators ACC1 and ACC0 respectively, are then doubled and the most significant bit q of the dividend d currently stored in the accumulator ACC0, is added to the remainder R. Then depending upon the results of the test on the remainder R, the divisor D is either added to or subtracted from the current value of the remainder R to derive a new value for the remainder which is again stored in accumulator ACC1.

Under step 2b if the current value of the remainder R is negative, the quotient Q in the accumulator ACC0 remains the same. On the other hand if the value of R is greater than or equal to 0 the value of the quotient Q in the accumulator ACC0 is incremented by 1.

Once step 2 has been iterated n times (n being equal to the number of binary bits in the dividend d), step 3 is performed once to restore the remainder R to a positive value if the current value in the accumulator ACC1 is negative.

As is well known, the values of R and Q in step 2a can be doubled by shifting them one position in the registers ACC1 and ACC0. It can be seen that it is necessary to test twice for the value of R during each iteration of the divide operation, in order to determine whether D should be added to or subtracted from R as detailed in step 2a, and then whether the quotient Q should remain the same or be incremented by 1 as detailed in step 2b. Hence using this standard technique, the remainder R must be tested twice during each step of the divide operation. Because it is necessary to test the value of R twice during each iteration of step 2, the number of instruction cycles is essentially double the number of binary bits in the dividend d. Step 3 is needed to restore the remainder to a positive value should the result in accumulator ACC1 be negative after step 2 is iterated n times.

SUMMARY OF THE INVENTION

It has been discovered that by utilizing an accumulator, a shift register and appropriately specifying the instruction cycles carried out by a split arithmetic logic unit, a divide algorithm can be utilized having N+1 instruction cycles where N is equal to the number of binary bits in the dividend.

Thus, in accordance with the present invention there is provided a digital signal processor for dividing a digital dividend signal by a digital divisor signal to obtain a digital quotient signal and a digital remainder signal. The processor includes an arithmetic logic unit having selectively concatenated independently controllable most significant bit and least significant bit sections, an accumulator and a shift register. The respective outputs of the sections of the accumulator are connected to those of the inputs of the shift register while the output of the shift register is coupled through the arithmetic logic unit back to the inputs of the sections of the accumulator.

The digital signal processor also includes a control unit for controlling the division of the digital dividend signal as follows:
(a) - loading the dividend signal into the least significant bit section of the accumulator; (b) - in the arithmetic logic unit, testing whether the current value of the digital signal from the most significant bit section of the accumulator is negative; (c) shifting the concatenated signal from the accumulator in the shift register to double the value thereof; (d) - if the test in (b) is true, adding in the arithmetic logic unit, the value of the divisor signal to the current value of the signal from the most significant bit section of the shift register and storing the resultant signal in the most significant bit section of the accumulator; (e) - also if the test in (b) is true, incrementing in the arithmetic logic unit, the value of the signal from the least significant bit section of the shift register by 1 and storing the resultant signal in the least significant bit section of the accumulator; (f) - else if the test in (b) is false, subtracting in the arithmetic logic unit, the value of the divisor signal from the current value of the signal at the output of the most significant bit section of the shift register and storing the resultant signal in the most significant bit section of the accumulator; (g) - repeating steps b to f, N times, where N=the number of binary bits of the dividend signal; then (h) - repeating step b; (j) - if the last repeated test of (b) is true, repeating step (d) and deriving the digital remainder signal from the most significant bit section of the accumulator, then repeating steps (c) and (e) and deriving the complemented digital quotient signal from the least significant bit section of the accumulator; and (k) - if the last repeated test of (b) is false, deriving the digital remainder signal from the most significant bit section of the accumulator, then repeating step (c) and deriving the complemented digital quotient signal from the least significant bit section of the accumulator.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
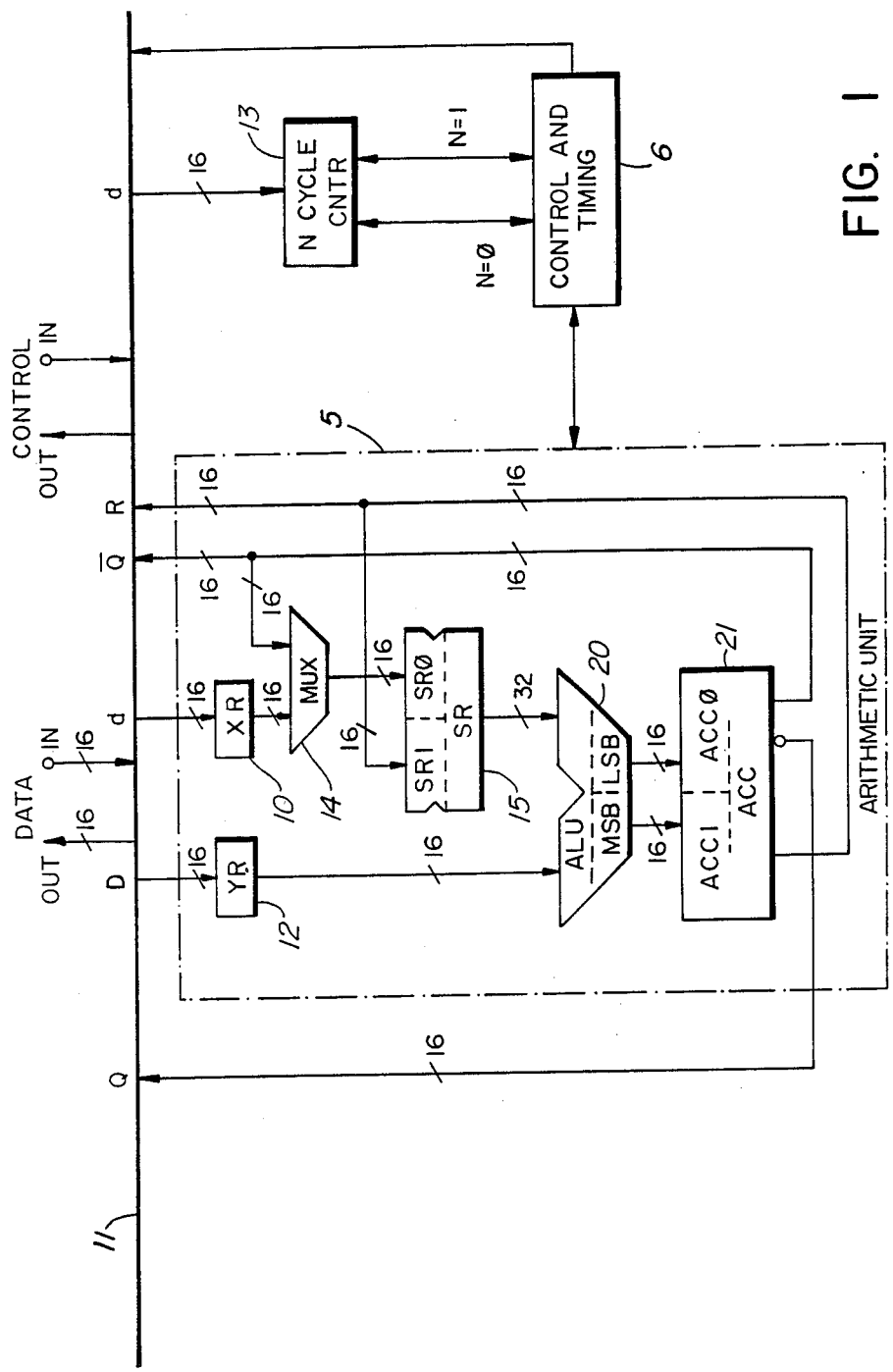
FIG. 1 is a block schematic diagram of a digital signal processor which can perform the division algorithm of the present invention.

In the division of a binary number, the quotient digit resulting from each processor cycle is either a "1" or a "0". This can be determined by subtracting the divisor from the remainder and looking at the sign of the result. If it is negative, the divisor must be added back on to restore the remainder, and the quotient bit is set to "0". If it is zero or positive, the new remainder becomes the resultant of the subtraction and the quotient bit is set to "1". As in all longhand division, a digit is then brought down after each step. As a result N such steps must be carried out for the division of a N bit positive binary dividend. The bringing down of a binary digit effectively doubles the remainder and adds the new digit to it. This can be achieved by shifting the remainder one position in a register and putting the digit brought down into the least significant position. If when the divisor is subtracted from the remainder a negative value results, the divisor must be added back on to restore the remainder since it was found that the current value of the remainder was smaller than the divisor.

As stated in the discussion of the prior art with respect to TABLE I, each processing cycle of the division requires two consecutive tests for the value of the remainder R. The second test has been eliminated by utilizing a modified division algorithm with a modified digital signal processor to perform this function. This can be better understood by reference to TABLE II which shows the division algorithm of the present invention.

In this division algorithm the accumulator ACC0 which will eventually hold the remainder R is initialized to 0, while the accumulator ACC1 which will eventually contain the quotient Q is initialized to the value of the dividend d.

Under step 2 of TABLE II, a test is then made to determine whether the current value of R in the accumulator ACC1 is less than 0 by checking whether its negative sign bit is set. Next, the current values of the remainder R and quotient Q are doubled and the most significant bit (MSB) stored in accumulator ACC0 is added to that of ACC1. This is readily achieved in a single operation by shifting the entire signal from the output of the accumulator ACC one bit position as it enters the register SR. The value of the divisor D is then added to that of the remainder R, and the result again stored in accumulator ACC0 while the value of the quotient Q is incremented by 1. Else, after doubling and adding the MSB, the divisor D is subtracted from that of the remainder R while the quotient Q remains unchanged. Step 2 is repeated N times which is equal to the number of bits in the dividend d.

In step 3, if the remainder R is negative, the value of the divisor D is added to it to restore the remainder to a positive integer. Also, to obtain the correct value of the quotient Q, its current value is again doubled in the accumulator ACC1 and then incremented by 1 by repeating step 2. This results in the complement value which can be readily inverted to derive the correct output. In step 3, if the remainder R is not negative, the current value of the remainder R is correct. The value of the quotient Q is obtained by repeating step 2 and inverting the result. As a result, the division of an N bit binary dividend can be completed in N+1 operation cycles as opposed to 2N+1 cycles for the division algorithm defined in TABLE I. This is achieved by utilizing a modified digital signal processor of the type illustrated in FIG. 1 when programmed to use the flow chart sequence illustrated in FIG. 2.

Figure 2:
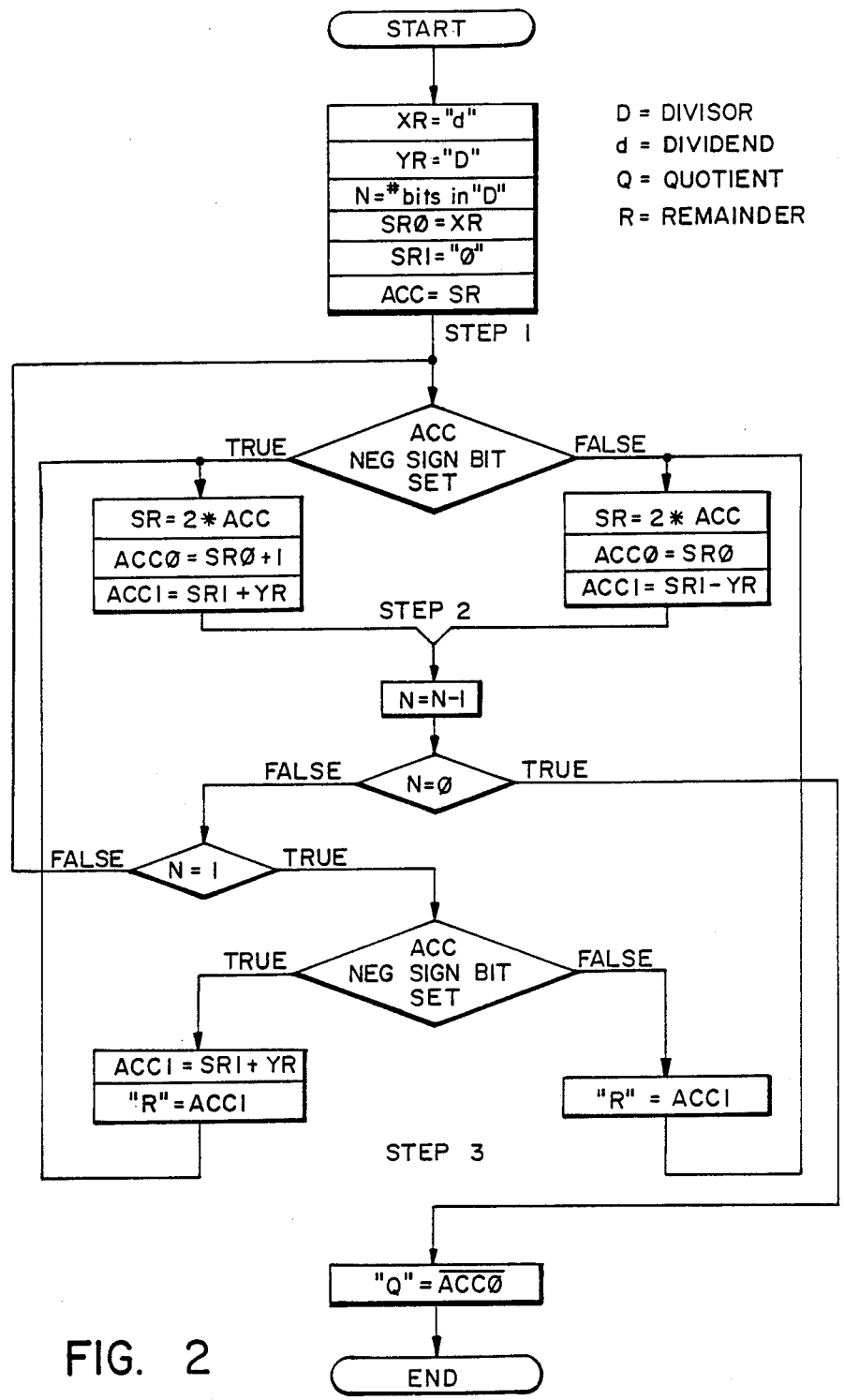
FIG. 2 is a flow chart of the division algorithm which may be implemented in the digital signal processor illustrated in FIG. 1.

Referring to FIGS. 1 and 2 the digital signal processor includes an arithmetic unit 5 in which a 16 bit digital dividend signal d is loaded into an XR register 10 from input data received through a bus 11. The divisor signal D is then loaded into a YR register 12 again through received data from the bus 11. The dividend signal d is als coupled to an N cycle counter 13 where the number of significant bits of the 16 bit word are initially determined. The dividend signal d from the XR register 10 is transferred through a multiplexer 14 to the least significant bit section SR0 of a 32 bit shift register 15. The most significant bit section SR1 of the shift register 15 is concurrently initialized to 0. This entire binary signal is then transferred from the SR0 and SR1 sections of the register 15 through an arithmetic logic unit (ALU) 20 on a 32 bit bus to the ACC0 and ACC1 sections respectively of an accumulator 21 to complete the initialization step 1 of TABLE II. This sequence is manifest in Step 1 of the flow chart illustrated in FIG. 2.

The ALU 20 is formed from two conventional 16 bit independently controllable units, one of which provides the most significant bit (MSB) section and the other the least significant bit (LSB) section. The ALU 20 MSB and LSB sections can be selectively concatenated to perform two 16 bit operations or one 32 bit operation with accumulator ACC0 holding the least significant bits and accumulator ACC1 holding the most significant bits of the binary result signal.

As the signal is transferred from the shift register 15 to the accumulator 21 the arithmetic logic unit 20 checks to determine whether the accumulator's negative sign bit is set thus indicating a negative number. The initial test will of course always result in the answer being false because accumulator ACC1 was initialized to 0. Regardless of the result, the entire signal from the accumulator 21 is transferred to the input of the shift register 15 and is then doubled by moving it one position towards the most significant bit end of the register 15. During this stage both the least and most significant bit sections SR0 and SR1 of the register 15 are concatenated. This automatically results in the most significant bit of the dividend d in the shift register SR0 being added to the current value of the remainder R in the shift register SR1.

As shown in step 2 of the flow chart in FIG. 2, when there is a false test result, the binary signal in the SR0 section of the register 15 is then transferred (via the arithmetic logic unit 20) to the ACC0 section of the accumulator 21, while the divisor D from the register YR 12 is subtracted from the binary signal in the most significant bit section of the register 15 (in the unit 20) with the result being stored in the accumulator ACC1.

Whenever the test under step 2 of Table II determines that the result stored in the accumulator is negative, thus a true test result, after doubling the value in the shift register 15, the current value of the quotient Q in the shift register SR0 is incremented by 1 while the divisor D from the register YR, is added to the current value of the remainder R. This latter step restores the remainder to a positive integer.

The N counter 13 is decremented by 1 and a test is then made to determine whether the count remaining is equal to 0. The result is transmitted to the control and timing unit 6 which controls the arithmetic unit 5. This test ensures that step 2 of the division algorithm is repeated N+1 times where N is equal to the number of binary bits in the dividend d. A second test is then performed to determine whether the count remaining is equal to 1. If not, step 2 of TABLE II is repeated. After N iterations of this step, the algorithm enters step 3.

In step 3 as shown in FIG. 2, the current value of the remainder R in the accumulator ACC1 is again tested to determine whether it is negative. If the remainder test proves false, the value in the shift register 15 is transferred directly to the accumulator 21 so as to derive the final value of the remainder R at the output of accumulator ACC1. On the other hand, if the test is true indicating that the current value of the remainder R is negative, the divisor D is again added to the remainder R to restore it to a positive value and derive the final value of the remainder R. Step 2 is then repeated one more time to obtain the complemented value of the quotient Q at the output of the accumulator ACC0. The correct value of the quotient Q can then be obtained by inverting the output of the accumulator ACC0. It is to be noted that the portions of step 2 affecting accumulator ACC1 need not be carried out during this final step since the remainder "R" has already been determined. However repeating the complete step simplifies the overall algorithm.

It is important to note that in this division algorithm the number of processing steps is substantially halved because of two functional differences. The ALU 20 is divided into two selectively concatenated independently controllable sections so that the values can be selectively processed to achieve one of these requirements. To take full advantage of this, the complement of the quotient Q is stored in the accumulator ACC0. In this way both halves of the ALU 20 simultaneously perform an add ($+D, +1$) or a subtract ($-D, -0$) step. The actual value of the quotient Q can also be readily obtained at the output of the accumulator ACC0 by taking the complement of its value upon completion of the division algorithm. In many storage registers both values are accessible directly from the register.

When the accumulator's negative signbit is set (thus indicating a negative number is stored therein), the ALU 20 performs the following steps: ACC0=SR0+1, and ACC1=SR1+YR. Whereas when the negative signbit is not set, the ALU 20 performs the steps ACC0=SR0 and ACC1=SR1-YR, as shown in step 2 of FIG. 2. It is the repetitive application of step 2 which permits the number of cycles required to complete the division operation to be essentially halved.

TABLE I

| | (PRIOR ART) | |
|---|---|---|
| OPERATIONS | ACC1 | ACC0 |
| 1. Initialize: | R = 0 | Q = d |
| 2. Repeat n times: | | |
| (a) if R<0: | R = 2*R+q | Q = 2*Q |
| | R = R+D | |
| else: | R = 2*R+q | Q = 2*Q |
| | R = R−D | |
| (b) if R<0: | | Q = Q |
| else: | | Q = Q+1 |
| 3. If R<0: | R = R+D | |
| else: | R = R | |

TABLE II

| OPERATIONS | ACC1 | ACC0 |
|---|---|---|
| 1. Initialize: | R = 0 | Q = d |
| 2. Repeat N times: | | |
| if R<0: | R = 2*R+q | Q = 2*Q |
| | R = R+D | Q = Q+1 |
| else: | R = 2*R+q | Q = 2*Q |
| | R = R−D | Q = Q |
| 3. If R<0: | R = R+D | |
| | Repeat 2. once | Q = (not) Q |
| else: | R = R | |
| | Repeat 2. once | Q = (not) Q | where: d = DIVIDEND    n BITS
       D = DIVISOR     m BITS

TABLE II-continued

| R = REMAINDER | n BITS |
|---|---|
| Q = QUOTIENT | n BITS |
| q = QUOTIENT | MSB |

What is claimed is:

1. A digital signal processor for dividing a digital dividend signal by a digital divisor signal to obtain a digital quotient signal and a digital remainder signal, the processor comprising:

an arithmetic logic unit (alu) having selectively concatenated independently controllable most (MSB) and least (LSB) significant bit sections having first and second inputs, and first and second outputs;

an accumulator (acc) having most (msb) and least (lsb) significant bit sections with respective inputs connected to the first and second outputs of the arithmetic logic unit;

a shift register (sr) having an additional signal input, and having an output connected to the second input to the arithmetic logic unit, means for connecting respective inputs of the shift register to first and second outputs of the accumulator; and a control means:

(a) for loading the dividend signal into the least significant bit section of the accumulator, (b) for testing whether the current value of the digital signal in the arithmetic logic unit from the most significant bit section of the accumulator is negative, (c) for shifting the concatenated signal from the accumulator in the shift register to double the value thereof, (d) in response to a negative msb signal in the accumulator, for adding in the most significant bit section of the arithmetic logic unit, the value of the divisor signal to the current value of the signal from the most significant bit section of the shift register and storing the resultant signal in the most significant bit section of the accumulator, (e) in response to a negative msb signal in the accumulator, for incrementing in the least significant bit section of the arithmetic logic unit, the value of the signal from the least significant bit section of the shift register by one, and storing the resultant signal in the least significant bit section of the accumulator (f) in response to a non-negative msb signal in the accumulator, for subtracting in the most significant bit section of the arithmetic logic unit the value of the divisor signal from the current value of the signal at the output of the most significant bit section of the shift register and storing the resultant signal in the most significant bit section of the accumulator;

(g) in response to an N cycle counter, for repeating functions (b) to (f) N times, where N equals the number of bits of the dividend signal; then for (h) repeating function (b), (j) in response to a negative msb signal in the accumulator, for repeating functions (d) (c) and (e) to derive the digital remainder signal from the most significant bit section and the inverted digital quotient signal from the least significant bit section of the accumulator; and (k) in response to a non-negative msb signal in the accumulator, for deriving the digital remainder signal from the most significant bit section of the accumulator, and for repeating function (c) to derive the inverted digital quotient signal from the least significant bit section of the accumulator.

* * * * *